United States Patent [19]

Brooks

[11] 4,227,129
[45] Oct. 7, 1980

[54] APPARATUS FOR DETECTING THE SPEED OF AN ELECTRIC MOTOR

[75] Inventor: Steven W. Brooks, Pamona, Calif.

[73] Assignee: Spin Physics, Inc., San Diego, Calif.

[21] Appl. No.: 7,288

[22] Filed: Jan. 29, 1979

[51] Int. Cl.³ .............................................. H02P 5/16
[52] U.S. Cl. .................................. 318/331; 318/334; 318/471
[58] Field of Search ............... 318/334, 471, 472, 473, 318/331

[56] References Cited

U.S. PATENT DOCUMENTS

| | | | |
|---|---|---|---|
| 3,475,672 | 10/1969 | Oltendorf | 318/331 |
| 3,737,751 | 6/1973 | Lima | 318/341 |
| 3,860,361 | 1/1975 | Gucker | 318/473 |

*Primary Examiner*—David Smith, Jr.
*Attorney, Agent, or Firm*—Robert F. Cody

[57] ABSTRACT

Apparatus for detecting the speed of an electric motor that forms part of a web transport system employs a bridge circuit adapted to measure the back emf of the motor. Thermally induced changes to the armature resistance of the motor are compensated for by varying the bridge resistances, such changes being identified by comparing the bridge circuit signal output with a reference signal.

12 Claims, 4 Drawing Figures

APPARATUS FOR DETECTING THE SPEED OF AN ELECTRIC MOTOR

BACKGROUND OF THE INVENTION

1. Field of the Invention

This invention relates in general to a web transport system of the reversing-type and, in particular, to apparatus for determining the speed of a motor associated with such a system.

2. Description Relative to the Prior Art

It is often desirable to know the speed of an electric motor and/or to produce a signal representative of motor speed, thereby to control the operation, say, of a web transport system employing such motor. Although tachometers, such as optical and electromagnetic speed sensors, are well known to the art of motor speed sensing and control, they constitute an expense which, desirably, might otherwise be avoided. To this end, it is also well known that the back electromotive force (emf) of a motor varies in direct proportion to motor speed and, as specifically taught in U.S. Pat. No. 3,733,529, such back emf can be determined by use of a bridge circuit comprising the armature resistance of the motor. Although the operation of a back emf sensing bridge circuit will be discussed in greater detail later, it is noted here that a problem inherent in the use of such a bridge circuit concerns the unsettling of the bridge balance by thermal effects associated with the armature resistance: As the motor runs, its armature heats up—thereby becoming a higher resistance—and causes the bridge circuit to become unbalanced. This causes the bridge circuit to register a wrong measure of motor speed.

To nullify the effect of resistance variation with temperature in a back emf sensing bridge circuit, it has been the practice in the art to situate a resistor, which in the bridge circuit corresponds to or equates with the armature resistance, right on (or at least proximate to) the housing of the motor whose speed is to be sensed. Thus, what thermally affects the armature resistance also thermally affects the corresponding resistor, with attendant relative stability in the balance of the bridge circuit. Such a technique works fine . . . but only to a point, i.e. speed sensing by such a technique can be in error by as much as 5%.

SUMMARY OF THE INVENTION

The invention is premised on the fact that, in a reversing-type web transport system, the back emf of a motor thereof will always be the same—regardless of the direction of web travel—whenever the motor has a given reference speed. For example, a particular motor of such a system will have the same speed, say when its armature ripple current has a speed-dependent frequency of 200 cps, whether the web is being wound on a takeup reel, or rewound on a supply reel. Such being the case, it is within the contemplation of the invention, in a back emf detecting bridge circuit for use in the described reversing-type transport system, to re-select an appropriate bridge-balancing resistor(s) whenever there is a (thermally induced) change in the measured back emf associated with a given reference motor speed. The selected resistor(s) is then used to rebalance the bridge circuit to maintain the accuracy of the bridge measurement.

Microprocessors are now available at low cost, and can be adapted to cooperate in making back emf comparisons, as well as to perform many other functions: The invention in a presently preferred form thereof employs a microprocessor in cooperation with a resistor-selecting register whereby, when a bridge imbalance is detected, an appropriate resistance is selected and employed in the bridge circuit for purposes of balancing the bridge circuit. For ease of understanding, the discussion of the workings of the microprocessor is herein limited to the resistor-selecting function, there being no reference to other functions which the microprocessor may perform.

The invention will be further described with reference to the figures of which:

Figure 1:
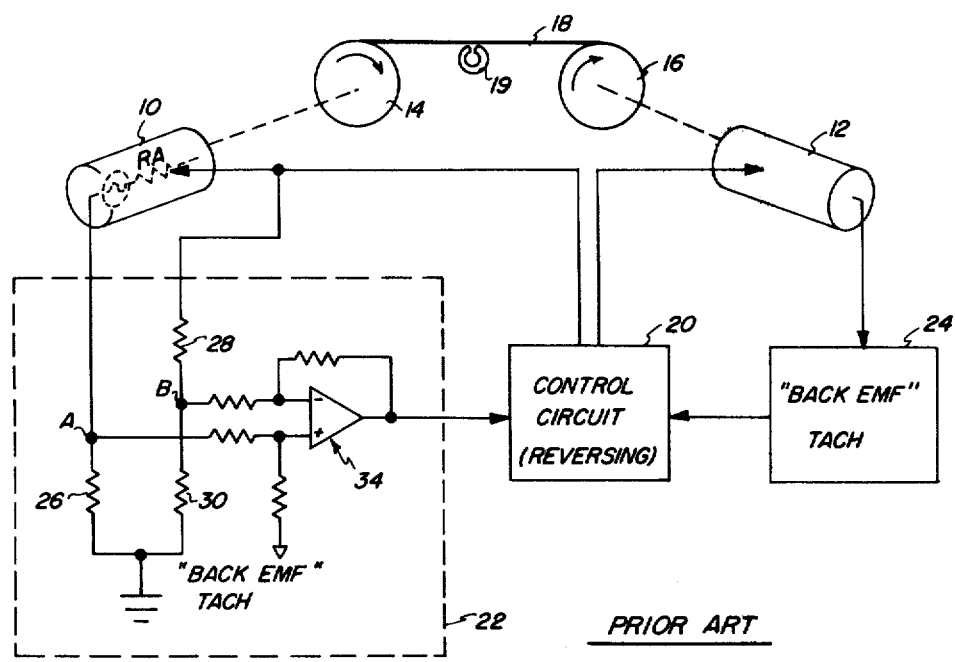
FIG. 1 is a schematic block diagram of a prior art system improvable by means of the invention.

Referring to FIG. 1, a prior art reversing-type transport system as discussed in U.S. Pat. No. 3,733,529 is depicted as comprising motors 10, 12 which drive reels 14, 16, respectively. The motor 12, when operating to drive the reel 16 as noted by the arrow thereon, serves as the take-up motor . . . the motor 10 at such time being a supply motor which is energized to exert a countertorque on the reel 14, thereby to tension the web 18 extending between the reels 14, 16. (It will be appreciated that although the reel 14 experiences the countertorque of the motor 10, such torque is overcome by the action of the motor 12, whereby the reel 14 rotates as noted by the arrow thereon.) At end-of-tape, i.e. when all of the tape 18 is on the reel 16 and none is on the reel 14, a control circuit 20 reverses the respective excitations of the motors 10, 12, whereby the motor 10 becomes the take-up motor and the motor 12 becomes the supply motor. The control circuit 20, as amply described in U.S. Pat. No. 3,733,529, controls the excitations of the motors 10, 12 so that the tape 18 has a constant rectilinear speed with respect to a magnetic head 19, doing so in accordance with the respective speeds of the motors 10, 12. To determine the speeds of the motors 10, 12, the referenced prior art detects the back emfs of the motors 10, 12 by means of respective circuits 22, 24, each of which preferably is identical. Representative circuit 22 is depicted as comprising a resistor 26 in series with the armature resistance $R_A$ of the motor 10, such series resistance connection being in parallel with series resistors 28, 30, thereby to form a resistance bridge circuit. The resistor 28 corresponds to and has the same nominal value of resistance as does the armature; and the resistor 26 has the same nominal resistance as does the resistor 30. The junctions A, B between the resistances in the parallel legs are connected into a difference circuit 34.

Since the same excitation voltage is applied across the resistance legs '$R_A$—26' and '28—30', the points A, B at start-up, i.e. when the reel 14 has yet to move, are at the same potential, and attendantly the difference circuit 34 has no output, evidencing a zero speed for the motor 10 at such time. As the motor speed builds up, however, its back emf (symbolized by the generator in dashed lines within the sketch of the motor 10) increases, causing the voltage at point A to be different from the voltage at point B in proportion to the speed of the motor 10.

Thus, the output of the difference circuit 34 is a signal corresponding to the speed of the motor 10.

Because the armature resistance $R_A$ is inherently in a thermally changing environment, its value is susceptible to change with temperature. And, when the armature resistance changes in value, the bridge circuit input to the difference circuit 34 becomes unbalanced . . . and causes the motor speed signal output of the circuit 34 to be erroneous. To nullify—at least to some degree—the effect of temperature on the armature resistance $R_A$, the resistor 28 may, for example, be placed atop the housing of the motor 10, whereby temperature changes will influence similarly both inputs to the circuit 34. As noted above, such a technique can cause the speed representative output of the circuit 34 to be accurate to within 5%.

Figure 2:
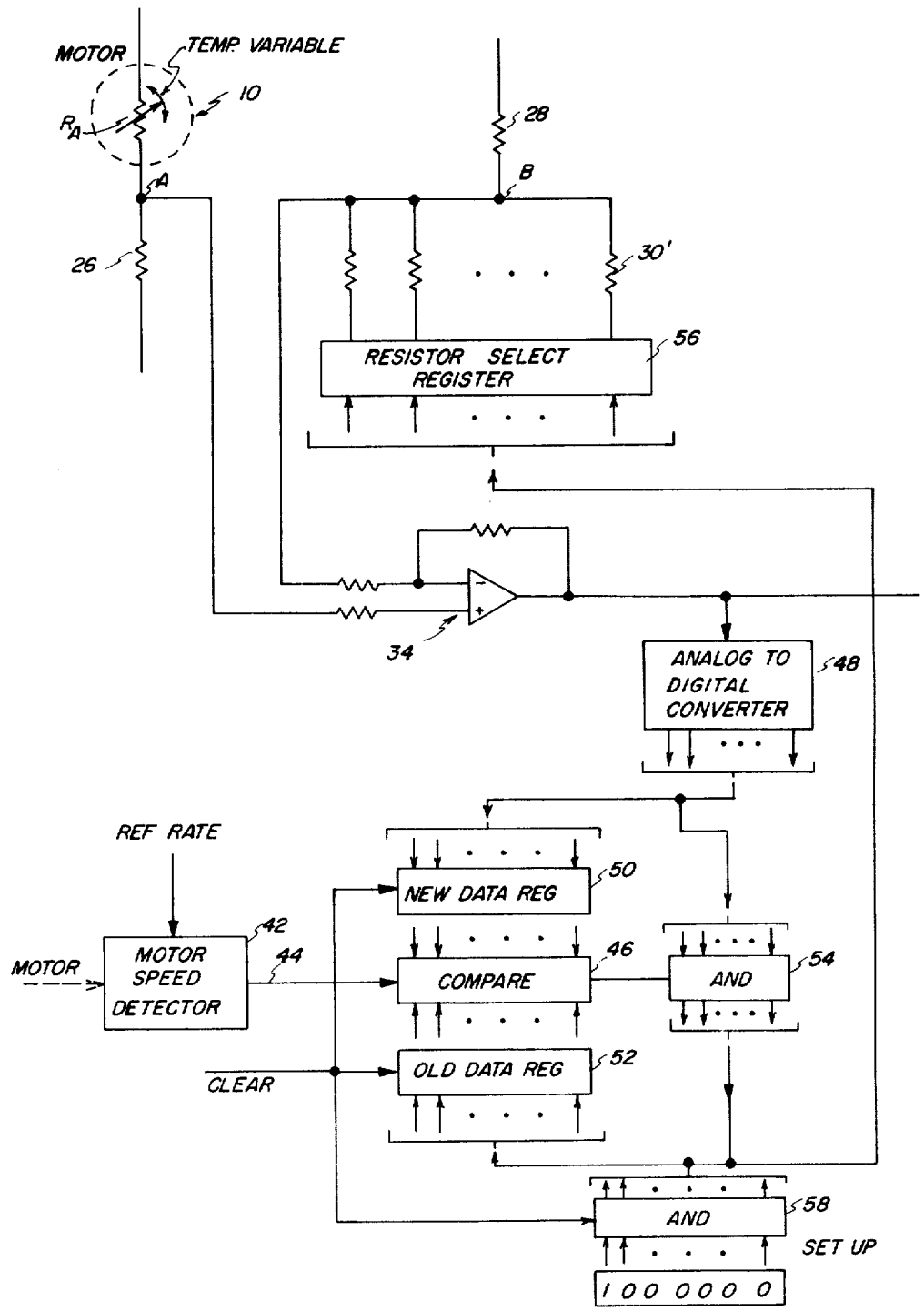
FIG. 2 is a schematic block diagram illustrating one embodiment of the invention.

To improve over the practice of the prior art, the invention in a presently preferred form thereof employs a bank of resistors 30' (see FIG. 2, wherein parts which are also found in FIG. 1 have similar character references and/or are primed) which are selectively inserted into the bridge circuit to keep the bridge circuit continually in balance. Thus, in the event the armature resistance $R_A$ were to rise (causing the voltage at point A to decrease) the selected aggregate resistance of the resistor bank 30' would be made to decrease, thereby to assure that the point B voltage tracks any variation in the resistance $R_A$.

As intimated above, the operation of the resistor-selecting function is premised on the fact that the back emf of a motor in a system as in FIG. 1 will be the same each time the motor attains a given reference speed . . . regardless of tape direction. This being the case, the invention teaches the measuring of the back emf of a motor at a given motor speed during both forward and reverse winding and, in the event there is a difference in measurement (as would be caused by a thermal change in the resistance $R_A$), the invention further teaches the selection of the appropriate resistance to keep the bridge circuit, comprising the resistances $R_A$, 26, 28 and 30', in balance.

To determine when the motor 10 has a given reference speed, the invention as presently preferred employs a 'motor speed' detector 42. Such a detector may, for example, take the form of a simple pick-up responsive to armature ripple current . . . and, when the frequency of the armature ripple current reaches a reference frequency, the detector produces a pulse on the line 44.

In response to a pulse on the line 44, a comparison circuit 46 (which may, for example, be an EXCLUSIVE OR circuit) compares one quantized (48) measurement of motor speed appearing in a register 50 with a previous quantized measurement of motor speed appearing in a second register 52. If the bridge circuit input to the difference circuit 34 is working properly, the registers 50, 52 will contain identical data. In the event of a mismatch in speed data, however, the comparison circuit 46, in response to the line 44 pulse, will actuate an AND circuit 54, thereby to update the speed representative data in the register 52, and to update the data in a register 56, the latter working to adjust the aggregate resistance value of the bank of resistors 30' as noted above.

Figure 3:
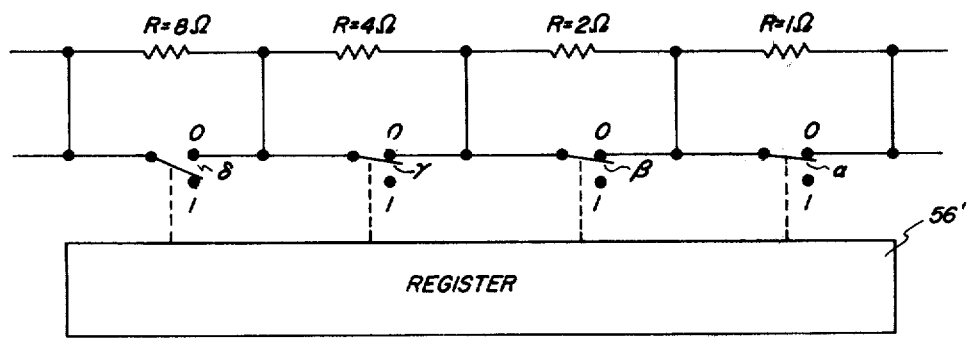
FIG. 3 is a simplified block diagram useful in describing a particular implementation of the invention.

At start-up, i.e. before the first tape "take-up" winding, a CLEAR pulse is applied to the registers 50, 52 and to an AND circuit 58, whereby (for a seven bit system) a quantized reference speed count of 1000000 is inserted into the registers 52, 56. Assuming the resistors in the bank 30' thereof are binary weighted, as is the preferred practice of the invention, there will be $2^7$ variations in selectable resistances available for bridge balancing, half of which are for increasing the aggregate selected resistance of the resistor bank 30', and half of which are for decreasing the aggregate resistance. (How this works can be quickly appreciated from FIG. 3: Assuming a simplified four-bit register 56' is set up with the count 1000, a switch δ in response thereto is opened, causing the aggregate selected resistance to be 8 ohms. Thus, depending on which of the switches α, β, γ, δ are closed, the aggregate selected resistance can be anywhere between 1 and 15 ohms, with 8 ohms being the midpoint resistance value. Of course, although mechanical switches α, β, γ, δ are depicted in FIG. 3, the use of electrical switches is within the preferred contemplation of the invention.)

Figure 4:
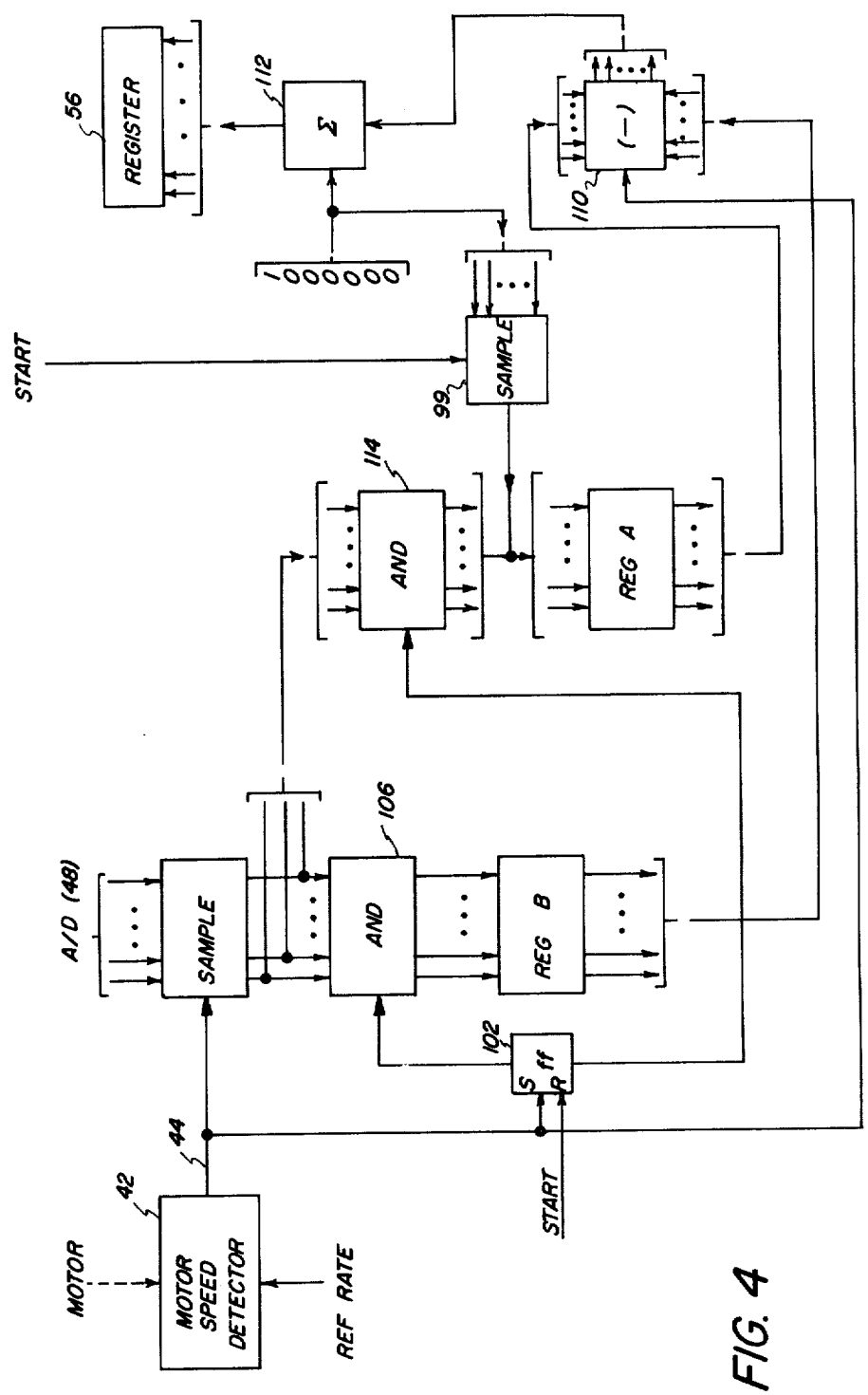
FIG. 4 is a schematic block diagram illustrating a presently preferred implementation of the invention.

Reference should now be had to FIG. 4 which shows a presently preferred embodiment of the invention adapted to discern the 'difference' between successive speed samples, using such difference to update a reference seven-bit count of 1000000 which corresponds to a particular motor speed when the speed sensing bridge circuit is in balance: Assuming that a START signal has been applied to a sampling circuit 99 and to a flip-flop 102, thereby to apply the referenced count of 1000000 to a register A and to reset the flip-flop 102, respectively . . . and assuming further that the tape of the transport system is being transported from start-of-tape to end-of tape . . . at a reference point, say, when the motor speed is at 500 RPM, the detector 42 applies a pulse to the line 44, causing the flip-flop 102 to SET. This opens an AND gate 106, and causes the sampled output of the analog-to-digital converter 48 to be applied to the register B. With the register A already storing the reference count 1000000, a difference circuit 110, responsive to the data of the registers A and B, produces at this time a difference count and applies such difference count to a summing device 112 for addition to the reference count of 1000000. Given that during the first traversal of tape through the system (i.e. when the flip-flop 102 is first SET) there is no thermal influence on the output of the analog-to-digital converter 48, the registers A and B will both store the same (reference) count and attendantly the difference circuit 110 will have no output.

Assume now, however, that during the "reverse" transport of tape from end-of-tape to start-of-tape a change has occurred in the output of the analog-to-digital converter 48 at the instant the line 44 is again pulsed, i.e. when the motor again hits a speed of 500 RPM: New data is AND gated (114) into the register A by action of the resetting flip-flop 102, causing the output of the difference circuit 110 to be representative of the data change that has occurred. The difference data output of the circuit 110 is then summed with the reference count, the result of which is stored in the register 56 which operates as described above. It will be appreciated that during the second transport of the tape from start-of-tape to end-of-tape, the flip-flop 102 is again SET at the reference motor speed . . . the analog-to-digital converter (48) output data which is applied to the register B at this time being perhaps different from the previously-taken data sample then appearing in the register A. Thus, while short term thermal drift of the bridge balance is identifiable by the register B-to-register A differencing of data, long term thermal drift of the bridge balance is identifiable by the register A-to-register B differencing of data.

The invention has been described with particular reference to certain preferred embodiments thereof and it will be understood that variations and modifications can be effected within the spirit and scope of the invention. For example, although the inventive technique provides for a bank of selectable resistors adapted for substitution for the FIG. 1 resistor 30, such a technique may also be used in connection with the FIG. 1 bridge resistors 26 or 28. Also, although the circuits of FIGS. 2 and 4 specifically depict digital building blocks, it is within the purview of the invention to employ analog circuit components as well. And, although the above discussion only addresses thermal balancing at one 'end-of-tape', it is certainly within the contemplation of the invention to balance respective bridge circuits at both 'ends-of-tape'. Further, although transit delays and devices therefor, and the like, have been excluded from the apparatus of FIGS. 2 and 4, it is well within the skill of those in the art to provide such devices as is appropriate.

What is claimed is:

1. In cooperation with an electric motor adapted for operation at various speeds, apparatus for determining the instantaneous speed of said motor comprising:
   (a) a bridge circuit comprising the armature resistance of said motor and first resistance means in series with said armature resistance to form a first bridge leg, and second and third resistance means in series with each other to form a second bridge leg in parallel with said first bridge leg,
   (b) differencing means responsive to the potential at the interconnection of said armature and said first resistance means and at the interconnection of said second and third resistance means to produce a motor speed representative signal corresponding to the difference between said potentials, said first, second, and third resistance means being of such resistance values as to cause said motor speed representative signal to be zero when said motor has zero speed,
   (c) means for producing a reference signal corresponding to the output that said differencing means should have when said motor has a reference speed,
   (d) means responsive when said motor has said reference speed for comparing said reference signal with the motor speed representative signal to produce a signal dependent on the difference between such signals, and
   (e) means cooperative with said comparing means for modifying the resistance value of at least one of the resistance means of said bridge circuit in accordance with the signal output of said comparing means.

2. The apparatus of claim 1, wherein said means for comparing includes means cooperative with said motor and responsive to the motor armature ripple current to actuate said means for comparing when said armature ripple current has a predetermined frequency.

3. In cooperation with an electric motor adapted for operation at various speeds, apparatus for determining the instantaneous speed of said motor comprising:
   (a) a bridge circuit comprising the armature resistance of said motor and first resistance means in series with said armature resistance to form a first bridge leg, and second and third resistance means in series with each other to form a second bridge leg in parallel with said first bridge leg,
   (b) differencing means responsive to the potential at the interconnection of said armature and said first resistance means and at the interconnection of said second and third resistance means to produce a motor speed representative signal corresponding to the difference between said potential, said first, second, and third resistance means being such as to cause said motor speed representative signal to be zero when said motor has zero speed,
   (c) means for storing said motor speed signal,
   (d) means for producing a reference signal corresponding to the output that said differencing means should have when said motor has a reference speed,
   (e) actuable means for comparing said motor speed signal and said reference signal to produce a signal corresponding to the error therebetween,
   (f) means cooperative with said motor for actuating said actuable means when the armature of said motor has a ripple current of a predetermined frequency, and
   (g) means responsive to the output of said means for comparing for modifying the magnitude of at least one of the resistance of said bridge circuit in accordance with said output.

4. In cooperation with an electric motor driven web transport system of the type that is adapted to transport a web in either of two opposite directions, apparatus for determining the instantaneous speed of a motor of such system comprising:
   (a) a bridge circuit comprising the armature resistance of said motor and first, second, and third resistance means, the armature and first resistance means being serially connected at a first point to form a first circuit leg and said second and third resistance means being serially connected at a second point to form a second circuit leg, said first and second circuit legs being electrically in parallel with each other,
   (b) means for producing a signal corresponding to the difference in potential at said first and second points, said signal being representative of said instantaneous speed of said motor, and said first, second, and third resistance means having respective resistances such that there is no motor speed signal when said motor is at zero speed,
   (c) means for producing a signal corresponding to a reference speed for said motor, said reference speed being different than the mid-range speed of said motor,
   (d) means responsive when said motor has said reference speed for comparing said reference speed signal with said instantaneous speed signal to produce an error signal, and
   (e) means for modifying the value of at least one resistance means of said bridge circuit in accordance with and to cancel said error signal,
whereby long and short time drift of said bridge circuit balance are compensated for during opposite travels of said web.

5. The apparatus of claim 4, wherein said means for producing a reference speed signal is a signal storage device, and wherein said means responsive when said motor has said reference speed is means responsive when the armature ripple current of said motor has a predetermined frequency.

6. In cooperation with an electric motor driven web transport system of the type that is adapted to transport a web in either of two opposite directions, apparatus for determining the instantaneous speed of a motor of such system comprising:
   (a) a bridge circuit comprising the armature resistance of said motor and first, second, and third resistance means, the armature and first resistance means being serially connected at a first point to form a first circuit leg and said second and third resistance means being serially connected at a second point to form a second circuit leg, said first and second legs being electrically in parallel with each other,
   (b) means for producing a signal corresponding to the difference in potential at said first and second points, said signal being representative of said instantaneous speed of said motor, and said first, second, and third resistance means having respective resistances such that there is no motor speed signal when said motor is at zero speed,
   (c) means for producing a signal corresponding to a reference speed for said motor,
   (d) means for quantiziing said motor and reference speed signals,
   (e) means responsive when said motor has said reference speed, said means being adapted to receive and compare said quantized speed signals for producing a quantized correction signal when there is a disparity between said speed signals, said quantized correction signal having dependence on the disparity between said quantized speed signals,
   (f) digital storage register means responsive to said quantized correction signal for storing said quantized correction signal, and
   (g) an array of resistors respectively associated with the stages of said register means and selectively adapted for substitution for at least one of the resistance means of said bridge circuit to maintain the balance of said bridge circuit when the resistance of said armature changes.

7. The apparatus of claim 6 wherein said resistors have respective binary weighted resistances.

8. The apparatus of claim 7 wherein said means responsive when said motor has said reference speed includes means responsive when the armature ripple current of said motor reaches a predetermined frequency.

9. The apparatus of claim 6 wherein said means responsive when said motor has said reference speed includes means responsive when the armature ripple current of said motor reaches a predetermined frequency.

10. The apparatus of claim 6 wherein said means for producing a quantized correction signal is means for producing a quantized signal representing the difference between said quantized speed signals, and wherein said apparatus includes means for combining said quantized difference signal with the quantized signal of said storage register means.

11. The apparatus of claim 6 wherein said means for producing a quantized correction signal is means adapted to apply the quantized motor speed signal to said storage register means.

12. Apparatus for determining the instantaneous speed of a variable speed motor comprising:
   (a) a bridge circuit comprising the armature resistance of said motor and first resistance means in series with said armature resistance to form a first bridge leg, and second and third resistance means in series with each other to form a second bridge leg in parallel with said first bridge leg,
   (b) differencing means responsive to the potential at the interconnection of said armature and said first resistance means and at the interconnection of said second and third resistance means to produce a motor speed representative signal corresponding to the difference between said potentials, said first, second, and third resistance means being of such resistance values as to cause said motor speed representative signal to be zero when said motor has zero speed,
   (c) means for producing a reference signal corresponding to the output that said differencing means should have when said motor has a reference speed,
   (d) means responsive when said motor has said reference speed for comparing said reference signal with the motor speed representative signal to produce a signal dependent on the difference between such signals, and
   (e) means cooperative with said comparing means for modifying the resistance value of at least one of the resistance means of said bridge circuit in accordance with the signal output of said comparing means.

* * * * *